Sept. 21, 1965 R. H. THATCHER 3,206,882

WIND ANIMATED LIGHT REFLECTING DEVICE

Filed Sept. 10, 1962 2 Sheets-Sheet 1

INVENTOR.
ROBERT H. THATCHER
BY
John H. Widdowson
ATTORNEY

INVENTOR.
ROBERT H. THATCHER
BY John H. Widdowson
ATTORNEY

United States Patent Office 3,206,882

Patented Sept. 21, 1965

3,206,882

WIND ANIMATED LIGHT REFLECTING DEVICE

Robert H. Thatcher, Wichita, Kans., assignor to National Sign Animators, Inc., Wichita, Kans., a corporation of Kansas Filed Sept. 10, 1962, Ser. No. 222,582
4 Claims. (Cl. 40—138)

This invention relates to visual means. In a more specific aspect this invention relates to scintillating reflecting means. Still more specifically, this invention relates to improvements in scintillating wind animated light reflecting means for sign assemblies of the type having reflective wafer-like disk elements loosely mounted on protruding support means, and to the resulting sign assemblies themselves. The reflective elements are free to vibrate or flutter to give a scintillating glittering or shimmering overall effect. And, my invention has been found particularly valuable for making signs used in outdoor advertising.

Scintillating wind animated means for signs utilizing loosely mounted reflective wafer-like disks or the like elements have long been known. The known scintillating signs are in general made up of intricate and complex mounting arrangements for the reflective disks. While the general idea of a scintillating wind animated sign is old, no completely satisfactory method has been devised to mount the reflective disks or like elements used in the scintillating signs. The known mounting means have utilized various types of construction including thin metal strips attached to the surface with bent, protruding legs or strips with the disks mounted thereon, and other forms such as complex pins riveted or driven into a solid backing. The signs using the known means of supporting the disks are difficult, tedious and time consuming to make and assemble. The supports are also fragile and subject to damage from wind, hail and the like. The disk support means, usually made up of a number of components, present an unattractive appearance. These components, usually made of metal, are subject to oxidation which causes deterioration as well as unsightly rust stains. The prior art support arrangements present many ledges and crevices which serve as dirt collectors. This reduces their attractiveness and basic appeal. Further, they are very difficult to clean. The supporting mechanism of the scintillating wind animated signs known to the prior art do not satisfactorily stand up in use. The vibrating action due to air currents very quickly wears them out causing the disks to become disengaged from the sign. Because of the complexity of the support arrangements, the signs are difficult to repair if damaged. Changing the disks or replacing them is quite a difficult operation if the pin supporting the disk is riveted or driven into or screwed into the support. Further, since the support mechanism is made up of a plurality of separate different elements, usually made up of different materials, the weathering effect on each element is different. Since this weathering effect differs on different parts of the sign, the uniformity of the sign appearance or color is impaired. The signs therefore quickly lose their initial new appearance.

I have by a relatively simple and dependable structure overcome the aforementioned disadvantages of the signs of the prior art. Scintillating wind animated signs made according to my invention with the new sign making means of my invention have proved reliable in use giving no difficulty over long periods.

The new scintillating sign making means and/or sign assembly of my invention has a support means. On this support means are provided spaced apertured protuberances. Pin means adapted to be inserted in the apertured protuberances are also provided. Disks mounted on the pin means secured to the protuberances are arranged according to the desired general shape of the sign indicia. Preferably, the support means is made up of a backing element and an overlying support element. The backing element can be provided with apertures which are aligned with the apertures in the protuberances, if desired.

The new wind animated scintillating sign means and/or sign assemblies of my invention overcome all of the aforementioned problems relating to wind animated scintillating signs of the prior art. The components of my sign indicia and devices are simple to make. Both the backing element and the support element can be formed by simple molding operations. The components are simple and easy to assemble into the completed sign indicia means. The sign means structure is strong, durable and weather-resistant, and the complete signs of my invention are likewise. The backing element and support element are preferably unitary, light, strong, sturdy, weather-resistant, plastic components. They have no intricate metal parts which can rust resulting in deterioration and rust stains. The unitary construction makes the elements simple and easy to clean if it should ever become necessary. Very colorful sign combinations are possible by utilizing various colored plastic or like material in the unitary construction. The colors retain their new appearance presenting an attractive sign for many years. The disk and pin arrangement of the new sign means construction of my invention is very resistant to wear. This is quite important since the elements of a wind animated sign are constantly in motion. Signs made according to my mode of construction are adapted to remain in operation for long periods of time requiring little or no maintenance. Further, if the reflective disks should ever need changing, as for example to obtain a different color combination, they can be quickly and easily interchanged with another set.

It is an object of this invention to provide a new visual means.

It is another object of this invention to provide a new wind animated scintillating sign means that is easy and simple to make and assemble.

Yet another object of this invention is to provide a new scintillating sign means and/or assembled sign that is resistant to weathering.

Still another object of this invention is to provide a new wind animated scintillating sign means and/or sign that is resistant to mechanical wear.

Still another object of this invention is to provide new scintillating sign means that is easy to clean and maintain.

Yet another object of this invention is to provide new wind animated scintillating sign means that is strong and durable.

Still another object of this invention is to provide in a wind animated scintillating sign means a new support arrangement for the reflective disks.

Other objects and advantages of the new wind animated sign means and/or assembly of my invention will become apparent to those skilled in the art upon reading this disclosure.

Drawings accompany and are a part of this disclosure. These drawing depict preferred specific embodiments of the new wind animated sign means structure of my invention and it is to be understood that such drawings are not to unduly limit the scope of my invention. In the drawings, FIG. 1 is an elevational view of a sign numeral "7" constructed in accordance with a preferred specific embodiment of structure of my invention.

Figure 1:
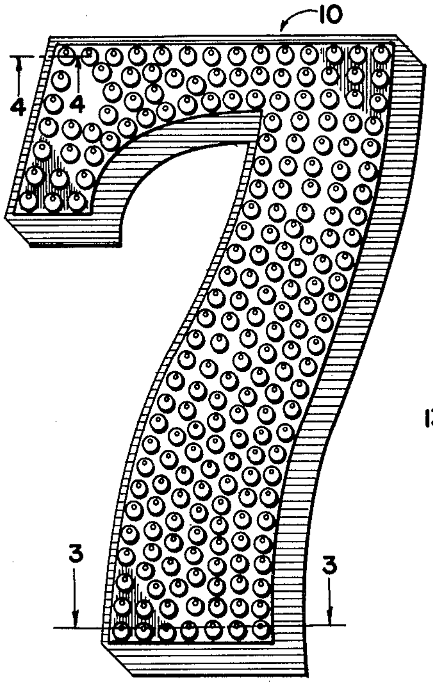

In the following is a discussion and description of the new wind animated sign means structure of my invention made with reference to the drawings whereon the same reference numerals are used to indicate the same or similar parts and/or structure. The discussion and description is of preferred specific embodiments of the new wind animated sign means structure of my invention, and it is to be understood that such is not to unduly limit the scope of my invention.

Figure 2:
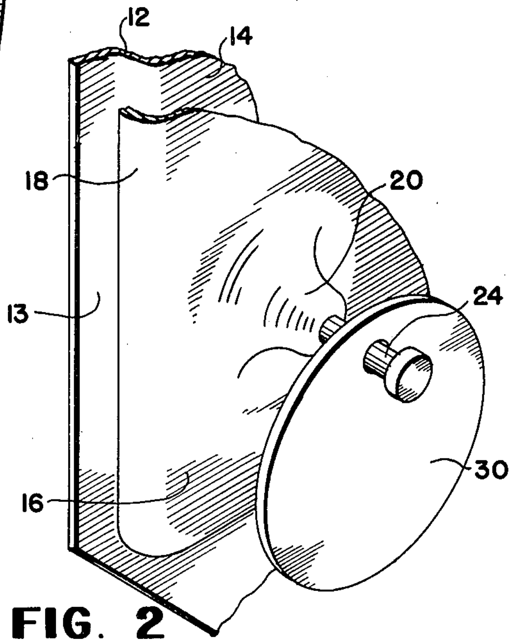
FIG. 2 is an enlarged fragmentary perspective view of a single disk and its support structure constructed in accordance with a preferred specific embodiment of my invention.
Figure 3:
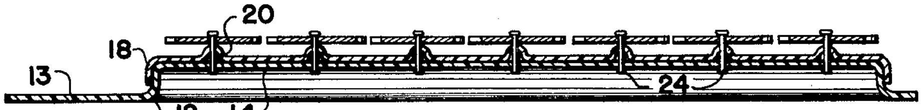
FIG. 3 is an elevational view in cross section taken on line 3—3 of FIG. 1.
Figures 4, 5:
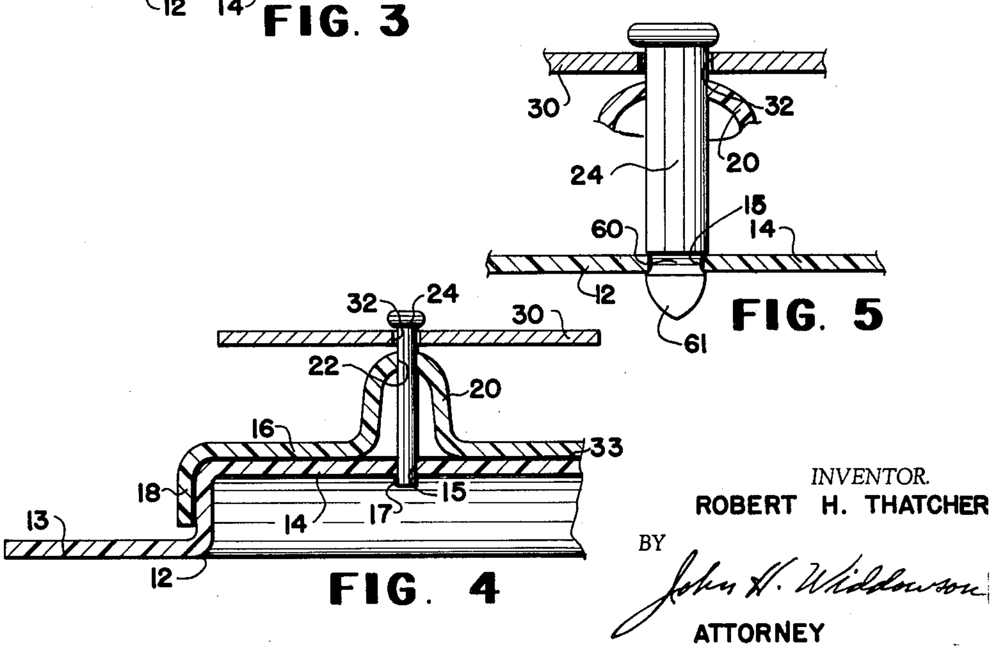
FIG. 4 is an enlarged fragmentary view in cross section taken on line 4—4 of FIG. 1 showing the structure of a single disk and its support.
FIG. 5 is an enlarged fragmentary view in cross section of a modified form of pin means of a preferred specific embodiment of my invention.

Referring now to the drawings FIGS. 1–7 and FIGS. 1–4 in particular, wind animated light reflecting sign letter 10 is a preferred specific embodiment of the new wind animated sign structure of my invention. The sign means 10 constitutes an assembly that is adapted to be mounted on a wall surface or any suitable support which may be flat, curved or otherwise to form a scintillating sign. The sign means can take on any desired shape or form. It may be used to form any indicia such as the letters of the alphabet, numerals, other figures or symbols as well as pictures and the like. Signs or sign elements constructed in accordance with the structure of my invention can be advantageously used in practically any application where a visual message is to be conveyed to a viewer. The possible applications, which are too numerous to envision and list, include use as directional arrows, and symbols, trademark symbols, billboard pictures, highway symbols and signs, and other applications utilizing indicia and the like. My invention can be used to make the entire visual device or sign or any part thereof. The visual device or sign can be planar, curved or any other desirable shape that lends itself to visual illustration. The sign means 10 as clearly illustrated in FIG. 3, has a backing element 12. This backing element has at least one flat embossed portion 14 which corresponds generally to the shape of the desired indicia. The embossed portion has a set of spaced apertures 15 disposable thereon. It can be provided with flat edge portions 13 which form shadows for the letters or indicia. The backing element is a thin generally sheet-like element, preferably constructed of polyvinyl plastic which has been compounded to make it rigid upon cure. However, any suitable material that is weather-resistant can be utilized. Further, it is contemplated that suitable materials other than plastic can also be utilized. A thin overlying generally sheet-like support element 16 having an overall shape corresponding to the shape of the desired indicia element and the embossed portion previously mentioned is provided. The support element has edge flanges 18, and a set of shaped generally tubular protuberances 20, each having a pointed projecting end with an aperture 22 disposed therein. The protuberances 20 are spaced from each other so that disks, which will be referred to late, can be suspended thereon and cover generally the surface of the embossed portion. The protuberances 20 correspond exactly in the placement to the placement of the set of apertures 15 in the embossed portion of the backing element. The support elements 16 and backing elements 12 can be made of any suitable plastic, or the like, but preferably are made of a rigid high impact vinyl plastic sheet. Other suitable plastics which can be used for the support and backing elements are polystyrene, polyvinyl acetate, polyepoxy resins, polyamides, cellulose acetate butyrate polymethylmethacrylate, and the like. Both thermoplastic and thermosetting plastic resins can be used. The support elements and also the backing elements, can be formed or molded in any suitable manner. The elements can be produced by heating a sheet of plastic and then either vacuum drawing, pressing between suitable shaped dies, or blow molding and the like. The elements may also be injection molded, cast or otherwise shaped. Due to the unitary construction of the elements, the construction of the sign or sign elements or indicia elements are particularly adapted for mass production techniques. It is also contemplated that materials other than plastics can be used in the construction of my sign means. Materials such as hard rubber, coated and sealed paper and pulpwood material, foamed materials, inorganic setting materials and the like can be utilized. As shown in FIG. 4, the support element 16 overlies the embossed portion 14 of the backing element with the back side of the support element contacting or substantially contacting the front side of the embossed portion of the backing element. A set of headed pins 24 is provided. These pins can be made of any suitable material but are preferably made of plastic. I have found that a polyamide plastic such as nylon works very well. The pins can be provided with a round head as shown in FIG. 2 or a T-shaped as shown in FIG. 8. The end opposite the head can be smooth, can have a small enlargement 17 as shown in FIG. 4, or be provided with any suitable securing means to secure it into position relative to the support element.

Preferably the pins are constructed with an annular groove 60 as illustrated in FIG. 5. The pin 24 preferably has a pointed end 61 to facilitate insertion. The pin 24 in locked in position when the groove 60 engages the aperture 15 in the backing element 12. The diameter of the aperture 15 is approximately the same diameter as the grooved portion of the pin. I have found that a groove depth of .002 inch works very well. The diameter of the pin 24 is preferably 3/32 of an inch. However, the dimensions can be varied, and are given by way of illustration and are not to be considered as limiting the scope of my invention.

A set of thin flat reflective disks 30 is provided. These disks 30, the number of which corresponds to the number of protuberances 20, can be made of any suitable material. Preferably they are made of plastic having a metalized surface. I have found that polyester plastic sold under the trademark "Mylar" having a metalized surface works very well, preferably metalized with aluminum, chromium, silver, zinc, and the like. Each of the disks 30 is provided with a non-centrally disposed aperture 32.

A thin layer of adhesive 33 is disposed between the embossed portions of the backing element and the back side of the support element opposite the protuberances 20 to fixedly secure same together. This adhesive can be any suitable resin or glue that is weather-resistant. I have found that a thin layer of epoxy resin works very well. In use, each of the pins 24 is loosely disposed in aperture 32 of disk 30 and secured to the sign means assembly by insertion in aperture 22 of the protuberance and the aperture 15 of the back element. The disks 30 are arranged to substantially cover the flat embossed portions to give the general dimension and outline of the desired sign indicia.

The indicia elements constructed in accordance with my invention which may consist of indicia elements of any desirable shape and size, and can be mounted on any suitable supporting surface, framework, or the like support means. The indicia elements can be nailed, glued, clamped or otherwise secured to a suitable support means. A sign or visual device can be composed entirely or in part of indicia elements made in accordance with my invention. It is also contemplated that the entire sign could be formed by a single indicia element of my invention.

Figure 6:
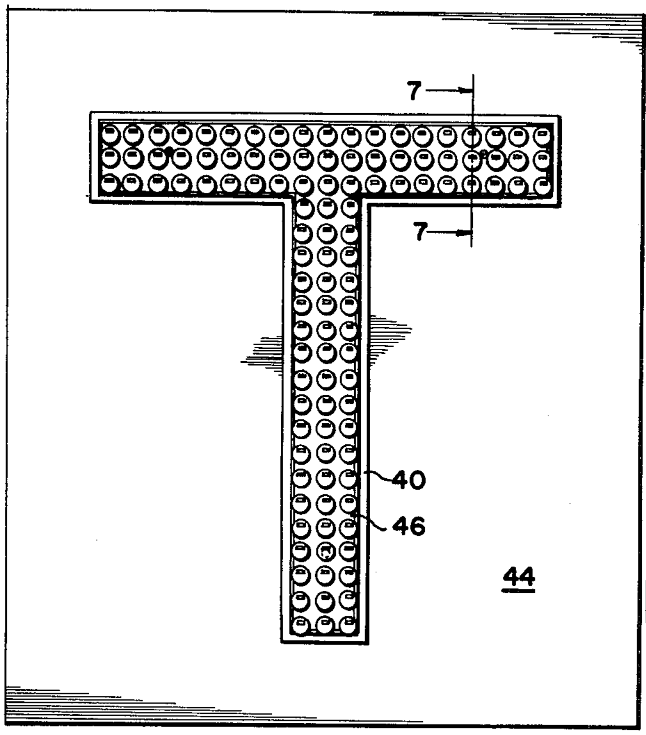
FIG. 6 is a front elevational view of a sign having the letter "T" thereon constructed in accordance with another preferred specific embodiment of my invention.
Figure 7:
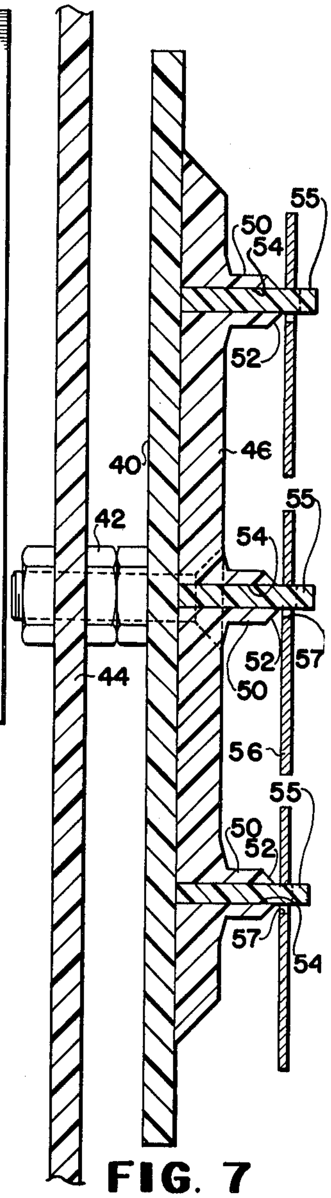
FIG. 7 is an enlarged elevational view in cross section taken on line 7—7 of FIG. 6.
Figure 8:
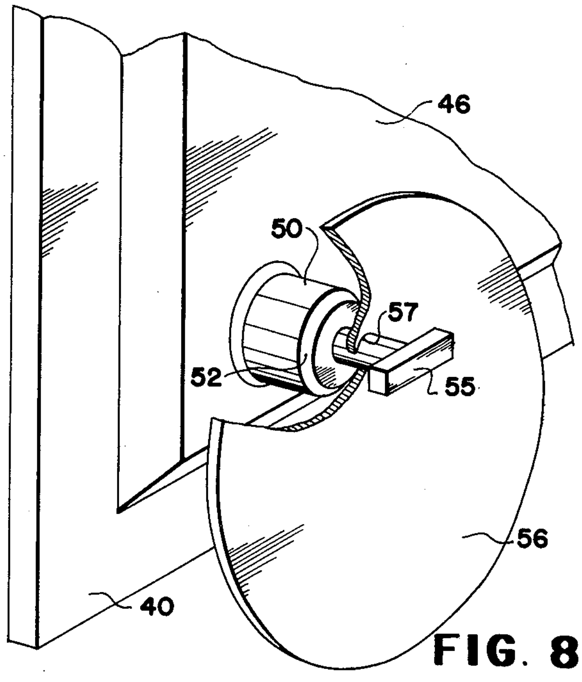
FIG. 8 is an enlarged fragmentary perspective view showing the specific details of a single disk and support of another preferred specific embodiment of my invention.

FIGS. 6–8 show a modified preferred specific embodiment of the new sign means of my invention. This assembly comprises a backing element 40 corresponding generally to the shape of the desired sign element ("T"). A mounting means 42 is provided on the back side of the backing element 40 to mount same on any suitable support 44. A preferably solid support element 46 is mounted on the front of element 40 and has the same general shape of the desired sign element. The support element 46 can be made of any suitable material such as plastic material and the like. However, I have found that a terpolymer blend of acrylonitrile butadiene and styrene copolymer resins commonly known as ABS polymer blends is most desirable. The same plastics listed previously for use in the backing element 12 and support element 16 of my embodiment structure shown in FIGS. 1–4 are desirable for use in this embodiment as backing elements and support elements. On the support element 46 are provided a set of spaced tubular-shaped protuberances 50, each protuberance having a tapered end 52 and a centrally disposed aperture 54 extending therethrough. A set of headed plastic pins 55 is disposed in the apertures 54 of the said set of spaced shaped protuberances 50. A set of the thin flat reflective metalized plastic disks 56 are shown mounted on pins 55 disposed in aperture 54. Each disk 56 has a non-centrally disposed aperture 57 adapted to receive headed pins 55. The pins 55 can be secured in the apertures in any suitable manner. They can be held in place by friction, by the provision of an enlargement on the end opposite the head, or secured in place by any suitable adhesive. It is contemplated that various modifications and adaptations of the sign construction I have described can be made by one skilled in the art. Various color combinations of the backing element, the support element, and disks can be used. Further, the shape of the indicia elements or the signs made therefrom are not necessarily restricted to one plane. If desired, sign indicia can be mounted on curved surfaces or on surfaces of compound curves.

As will be obvious to those skilled in the art various changes and modifications of the preferred wind animated sign means and/or sign structures disclosed herein can be made or followed without departing from the spirit of the disclosure or from the scope of the claims.

I claim:

1. An assembly adapted to be mounted on a wall surface or other flat support forming a scintillating sign means comprising a thin rigid generally sheet-like shaped vinyl plastic backing element, said backing element having at least one flat embossed portion corresponding to the shape of a desired indicia, a set of generally uniformly spaced apertures in said embossed portion, at least one thin and rigid overlying generally sheet-like vinyl plastic support element having an overall shape corresponding to the shape of the desired indicia and said embossed portion, edge flanges on said support element, a set of generally tubular protuberances, each having pointed projecting end with a central aperture disposed therein on said support element said protuberances projecting in a direction opposite said edge flanges and corresponding exactly in placement to the placement of said set of apertures in said embossed portion, a set of headed polyamide plastic pins, a set of thin flat reflective metalized polyester plastic disks each disk having a non-centrally disposed aperture, a thin layer of epoxy resin adhesive disposed between said embossed portions of said backing element and the back side of said support element opposite said protrusions to fixedly secure same together, said disks loosely mounted on said pins secured in the aligned apertures in said support element and said backing element, said disks arranged to substantially cover said support element to collectively provide the desired sign indicia.

2. A scintillating sign means assembly adapted to be mounted on a wall surface or flat support comprising a thin plastic backing element, at least one flat embossed portion on said backing element, a set of spaced apertures in said embossed portion, a thin plastic overlying support element corresponding generally to the shape of said embossed portion, edge flanges on said support element projecting at an angle from the plane of said support element and overlapping the edge of said embossed portion and in close position to the side of said embossed portion, a set of protuberances on said support element projecting in the direction opposite said flanges, each having a centrally disposed aperture corresponding in placement to the placement of said spaced apertures in said embossed portion, a set of headed plastic pins, a set of thin flat reflective disks, each disk having a non-centrally disposed aperture, a layer of adhesive disposed between said embossed portion of said backing element and said support element to fixedly secure same together, said disks loosely mounted on said pins inserted through the aligned apertures in said support element and said backing element to collectively form desired indicia.

3. A scintillating sign means assembly comprising, a relatively thin backing element having at least one front facing raised portion having a plurality of spaced apertures therein, a relatively thin sheet-like support element having the same general shape as said raised portion mounted on front of said raised portion and having edge portions projecting at an angle to the plane of said support element with said edge portions overlapping the edge of said raised portion and in close position to the sides of said raised portion, a plurality of spaced protuberances on said support element having central apertures therein in alignment with corresponding apertures in said backing element, pin means having head retaining means mounted and secured in said apertures in said backing element and the corresponding protuberances in said support element and projecting outward thereof, and disks loosely mounted and secured on said pin means to the outside of said support element and between same and said retaining means of said pin means, said disks arranged to collectively provide indicia.

4. A scintillating sign means assembly comprising, a thin generally sheet-like backing element provided with at least one flat embossed portion thereon, a set of spaced apertures in said embossed portion, a thin generally sheet-like overlying support element having an overall shape corresponding to the shape of said embossed portion, edge flanges on said support element projecting at an angle from the plane of said support element and overlapping the edge of said embossed portion and in close position to the sides of said embossed portion, a set of protuberances on said support each having a centrally disposed aperture corresponding in placement to the placement of said set of apertures on said embossed portion, a set of headed pins, each of the pins of said set of headed pins having an annular groove adjacent the end opposite the head, and each pin disposed in an aperture in a protuberance and an aligned aperture in said embossed portion, and said pins mounted in said backing element and contacting same at the grooves in said pins, a set of thin reflective disks, each disk having a non-centrally disposed aperture, a means to secure said embossed portions of said backing element and support element in contacting relationship, said disks loosely mounted on said pins inserted through said aligned apertures in said support element and said backing element in an arrangement to collectively form desired indicia.

References Cited by the Examiner

UNITED STATES PATENTS

| | | | |
|---|---|---|---|
| 1,930,656 | 10/33 | Nave | 40—143 X |
| 2,128,118 | 8/38 | Burford | 40—143 X |
| 2,738,297 | 3/56 | Pfistershammer | 156—292 X |
| 2,807,564 | 9/57 | Mitchell | 40—136 X |
| 2,843,970 | 7/58 | Keuls | 40—143 X |
| 2,912,778 | 11/59 | Battaglia | 40—138 |
| 2,969,606 | 1/61 | Battaglia | 40—138 |
| 3,033,723 | 5/62 | Mead | 156—292 X |
| 3,043,039 | 7/62 | Battaglia | 40—138 |
| 3,067,536 | 12/62 | Brittsan | 40—143 X |

FOREIGN PATENTS

| | | |
|---|---|---|
| 1,103,062 | 5/55 | France. |

JEROME SCHNALL, *Primary Examiner.*